US012799372B2

(12) United States Patent
Binder et al.

(10) Patent No.: US 12,799,372 B2
(45) **Date of Patent: *Nov. 17, 2026**

(54) ACRYLIC-BASED ADHESIVE COMPOSITION WITH ETHYLENE/ACID COPOLYMER

(71) Applicants: Dow Global Technologies LLC, Midland, MI (US); Rohm and Haas Company, Collegeville, PA (US)

(72) Inventors: Joseph B. Binder, Collegeville, PA (US); Sehban N. Ozair, Collegeville, PA (US); David L. Malotky, Midland, MI (US); Saswati Pujari, Collegeville, PA (US); Isabelle Uhl, La Plaine Saint-Denis (FR); Vinita Yadav, Collegeville, PA (US); Robert S. Moglia, Midland, MI (US)

(73) Assignees: Dow Global Technologies LLC, Midland, MI (US); Rohm and Haas Compnay, Collegeville, PA (US)

( * ) Notice: Subject to any disclaimer, the term of this patent is extended or adjusted under 35 U.S.C. 154(b) by 731 days.

This patent is subject to a terminal disclaimer.

(21) Appl. No.: 18/245,435

(22) PCT Filed: Sep. 14, 2021

(86) PCT No.: PCT/US2021/050242

§ 371 (c)(1),
(2) Date: Mar. 15, 2023

(87) PCT Pub. No.: WO2022/060718

PCT Pub. Date: Mar. 24, 2022

(65) Prior Publication Data

US 2023/0340302 A1 Oct. 26, 2023

(30) Foreign Application Priority Data

Sep. 15, 2020 (FR) ........................................ 2009334

(51) Int. Cl.

| | |
|---|---|
| ***C09J 7/38*** | (2018.01) |
| ***C08K 3/00*** | (2018.01) |
| ***C08K 3/20*** | (2006.01) |
| ***C08K 5/00*** | (2006.01) |
| ***C08K 5/09*** | (2006.01) |
| ***C08K 5/17*** | (2006.01) |
| ***C08K 5/41*** | (2006.01) |
| ***C08L 23/0869*** | (2025.01) |
| ***C08L 33/08*** | (2006.01) |
| ***C09J 7/20*** | (2018.01) |
| ***C09J 123/08*** | (2006.01) |
| ***C09J 133/08*** | (2006.01) |

(52) U.S. Cl.

CPC ................. *C09J 7/385* (2018.01); *C08K 3/00* (2013.01); *C08K 3/20* (2013.01); *C08K 5/00* (2013.01); *C08K 5/09* (2013.01); *C08K 5/17* (2013.01); *C08K 5/41* (2013.01); *C08L 23/0869* (2013.01); *C08L 33/08* (2013.01); *C09J 7/20* (2018.01); *C09J 123/0869* (2013.01); *C09J 133/08* (2013.01); *C08L 2205/00* (2013.01); *C08L 2205/08* (2013.01); *C09J 2301/302* (2020.08); *C09J 2301/312* (2020.08); *C09J 2301/408* (2020.08); *C09J 2433/00* (2013.01)

(58) Field of Classification Search

None

See application file for complete search history.

(56) References Cited

U.S. PATENT DOCUMENTS

| | | | | |
|---|---|---|---|---|
| 4,853,427 A * | 8/1989 | Herten | C08L 55/02 524/394 |
| 4,879,333 A | 11/1989 | Frazee | |
| 5,814,685 A * | 9/1998 | Satake | C09D 11/326 525/902 |
| 6,521,679 B1 * | 2/2003 | Okada | C08J 3/03 524/845 |
| 6,521,696 B2 | 2/2003 | Oates et al. | |
| 6,562,888 B1 | 5/2003 | Frihart et al. | |

(Continued)

FOREIGN PATENT DOCUMENTS

| | | |
|---|---|---|
| CN | 1461770 A | 12/2003 |
| CN | 101372607 A | 6/2010 |

(Continued)

OTHER PUBLICATIONS

Aldrich Data Sheet (Year: 2019).*

(Continued)

*Primary Examiner* — Frank D Ducheneaux

(74) *Attorney, Agent, or Firm* — Boyle Fredrickson S.C.

(57) ABSTRACT

The present disclosure is directed to a water-based pressure-sensitive adhesive composition. In an embodiment, the water-based pressure-sensitive adhesive composition includes (A) an acrylic dispersion composed of particles of (i) an acrylic-based polymer with a glass transition temperature (Tg) less than −20° C., and (ii) a surfactant. The water-based pressure-sensitive adhesive composition also includes (B) an ethylene acid dispersion composed of (i) particles of an ethylene acid copolymer having from 3 wt % to less than 50 wt % acid comonomer and a melt index from 1 g/10 min to 100 g/10 min, and (ii) at least one of a dispersant or a neutralizing agent. Further disclosed are articles with the water-based pressure-sensitive adhesive composition.

14 Claims, No Drawings

(56) References Cited

U.S. PATENT DOCUMENTS

| | | | |
|---|---|---|---|
| 6,630,238 | B2 | 10/2003 | Hyde et al. |
| 7,070,051 | B2 * | 7/2006 | Kanner ............ A61B 17/06133 206/460 |
| 8,247,063 | B2 | 8/2012 | Holbert et al. |
| 10,167,416 | B2 * | 1/2019 | Clay ...................... C09J 125/04 |
| 2013/0202885 | A1 | 8/2013 | Dodge et al. |
| 2013/0202886 | A1 | 8/2013 | Gerst et al. |
| 2013/0330548 | A1 | 12/2013 | Aoyama et al. |
| 2014/0137435 | A1 | 5/2014 | Yano |
| 2014/0142238 | A1 | 5/2014 | Guo |
| 2015/0160939 | A1 | 6/2015 | Filatov et al. |
| 2015/0218426 | A1 * | 8/2015 | Clay ................... C08L 23/0869 524/271 |

FOREIGN PATENT DOCUMENTS

| | | | |
|---|---|---|---|
| DE | 2558916 | A1 | 7/1976 |
| EP | 1862520 | A1 | 12/2007 |
| JP | S52-143147 | A | 11/1977 |
| JP | S58-079068 | A | 5/1983 |
| JP | S58-113277 | A | 7/1983 |
| JP | S58-113278 | A | 7/1983 |
| JP | H0224379 | A | 1/1990 |
| JP | H04/253784 | A | 9/1992 |
| JP | H07-233358 | A | 9/1995 |
| JP | 2001/089729 | A | 4/2001 |
| JP | 2003276126 | A * | 9/2003 |
| WO | 2003072654 | A2 | 9/2003 |
| WO | 2011003864 | A1 | 1/2011 |
| WO | 2011062852 | A1 | 5/2011 |
| WO | 2014/000631 | A1 | 1/2014 |
| WO | 2015084643 | A2 | 6/2015 |
| WO | 2015153987 | A1 | 10/2015 |
| WO | 2015160939 | A1 | 10/2015 |
| WO | 2018165827 | A1 | 9/2018 |

OTHER PUBLICATIONS

Machine translation of JP_2003276126_A (Year: 2003).*

PCT/US2021/050242 International Search Report and Written Opinion with Mailing Date of Mar. 24, 2022.

* cited by examiner

ACRYLIC-BASED ADHESIVE COMPOSITION WITH ETHYLENE/ACID COPOLYMER

BACKGROUND

A pressure sensitive adhesive ("PSA") is an adhesive that bonds with an adherent when pressure is applied to it. PSAs differ from adhesives that are activated by heat, irradiation, or a chemical reaction, for example. Typically, a waterborne PSA is applied to a substrate as an emulsion or as a dispersion, which is then dried to remove the liquid carrier.

A pressure sensitive adhesive is typically characterized by its adhesion and its cohesion. Adhesion is exhibited by a PSA's peel strength and/or tack to the substrate. Cohesion is exhibited by a PSA's shear resistance. An inverse relationship exists between adhesion and cohesion whereby a PSA with high adhesion has low cohesion, and a PSA with low adhesion has high cohesion.

Certain adhesive applications, however, require both high adhesion and high cohesion. Known is the addition of a tackifier to an acrylic-based PSA to increase adhesion. However, typically a tackifier decreases cohesion when added to an acrylic-based PSA. Hence, the art recognizes the need for acrylic-based PSAs with increased cohesion while not degrading adhesion. A need further exists for an acrylic-based PSA composition with increased adhesion with no degradation to cohesion without the use of a tackifier.

SUMMARY

The present disclosure provides a water-based pressure-sensitive adhesive composition. In an embodiment, the water-based pressure-sensitive adhesive composition includes (A) an acrylic dispersion composed of particles of (i) an acrylic-based polymer with a glass transition temperature (Tg) less than −20° C., and (ii) a surfactant. The water-based pressure-sensitive adhesive composition also includes (B) an ethylene acid dispersion composed of (i) particles of an ethylene acid copolymer having from 3 wt % to less than 50 wt % acid comonomer and a melt index from 1 g/10 min to 100 g/10 min, and (ii) at least one of a dispersant or a neutralizing agent. Further disclosed are articles with the water-based pressure-sensitive adhesive composition.

The present disclosure provides an article. In an embodiment, the article includes a first substrate; and a layer of a water-based pressure-sensitive adhesive composition on the first substrate. The water-based pressure-sensitive adhesive composition is composed of (A) an acrylic dispersion composed of particles of (i) an acrylic-based polymer with a glass transition temperature (Tg) less than −20° C., and (ii) a surfactant. The water-based pressure-sensitive adhesive composition also includes (B) an ethylene acid dispersion composed of (i) particles of an ethylene acid copolymer having from 3 wt % to less than 50 wt % acid comonomer and a melt index from 1 g/10 min to 100 g/10 min, and (ii) at least one of a dispersant or a neutralizing agent.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

An "acrylic-based monomer," as used herein, is a monomer containing the Structure (I) below:

Structure (I)

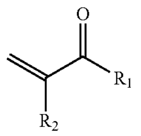

wherein $R_1$ is a hydroxyl group or a $C_1$-$C_{18}$ alkoxy group and $R_2$ is H or $CH_3$. Acrylic-based monomers include acrylic acid, methacrylic acid, acrylates, and methacrylates.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably.

An "olefin-based polymer" or "polyolefin" is a polymer that contains more than 50 weight percent polymerized olefin monomer (based on total amount of polymerizable monomers), and optionally, may contain at least one comonomer. A nonlimiting example of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

Test Methods

Adhesion/Tack Test: Samples are tested on both stainless steel ("SS") and high density polyethylene ("HDPE") test plates according to Féderation Internationale des fabricants et transformateurs d'Adhésifs et Thermocollants ("FINAT") Test Method No. 2. Cohesion/Shear Test: FINAT Test Method No. 8 is used for the shear resistance test on stainless steel plates. Failure mode is recorded behind the value of the tests: "AF" indicates adhesion failure. "AFB" indicates adhesion failure from the backing, i.e., the release liner. "CF" indicates cohesion failure. "MF" indicates mixture failure. Peel Adhesion Test. FINAT Test Method No. 2 was followed for peel strength test at 90° on high density polyethylene (HDPE) test plates. FINAT is the European association for the self-adhesive label industry (Laan van Nieuw-Oost Indië 131-G, 2593 BM The Hague, P.O. Box 85612, 2508 CH The Hague, The Netherlands). Before testing, the sample strip was applied to test plate for dwell time of 20 min.

Density is measured in accordance with ASTM D792, Method B. The result is recorded in grams per cubic centimeter (g/cc).

Differential Scanning Calorimetry (DSC)

Differential Scanning Calorimetry (DSC) can be used to measure the melting, crystallization, and glass transition behavior of a polymer over a wide range of temperature. For example, the TA Instruments $Q_{1000}$ DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Loop Tack (PSTC Test Method 16) (Pressure Sensitive Tape Council, One Parkview Plaza, Suite 800, Oakbrook Terrace, IL 60101, USA) is performed as follows. The Loop Tack test measures the initial adhesion when the adhesive comes in contact with the substrate. Testing is conducted after the adhesive laminate is conditioned in a controlled environment (22.2 to 23.3° C. (72-74° F.), 50% relative humidity) for at least 1 day. A strip 2.54 cm (1 inch) wide is cut and folded over to form a loop, exposing the adhesive side. It is then placed in between the jaws of the INSTRON™ tensile tester, and the lower jaw is lowered at a rate of 12 in/min to the substrate such that a square area of the adhesive of 2.54 cm by 2.54 cm (1 inch×1 inch) comes in contact with the substrate for 1 second. Then the adhesive is pulled away and the peak force to pull the adhesive away from the substrate is recorded.

Melt index (MI) (I2) in g/10 min is measured using ASTM D1238 (190° C./2.16 kg).

Melt flow rate (MFR) in g/10 min is measured using ASTM D1238 (230° C./2.16 kg).

Melt Viscosity is measured using a Brookfield Viscometer Model, and a Brookfield RV-DV-II-Pro viscometer spindle 31, at 140° C. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature until the melted sample is one inch below the top of the sample chamber. The viscometer apparatus is lowered, and the spindle submerged into the sample chamber. Lowering was continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for 15 minutes, or until the values stabilize, at which point, a final reading is recorded.

Emulsion or dispersion viscosity is measured using a Brookfield Viscometer Model, and a Brookfield RV-DV-II-Pro viscometer spindle #2 or #3, at 25° C. The sample is poured into a wide mouth cup and enough volume is poured in that when the viscometer apparatus is lowered, the spindle should be completely submerged into the dispersion. The viscometer is turned on and set to operate at a shear rate of 12, 30, or 60 RPM. Readings are monitored for 15 minutes, or until the values stabilize, at which point, a final reading is recorded.

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, The Construction of a Polyethylene Calibration Curve for Gel Permeation Chromatography Using Polystyrene Fractions, 6 J. Polymer Sci. Pt. B: Polymer Letter 621, 621-624 (1968)) to derive the following equation:

$$M\text{ polyethylene}=a\times(M\text{polystyrene})^b$$

In this equation, a=0.4316 and b=1.0.

Number average molecular weight, Mn, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$Mn=\Sigma n_i*M_i/\Sigma n_i=\Sigma w_i/\Sigma(w_i/M_i)$$

wherein $n_i$=number of molecules with molecular weight $M_i$ $w_i$=weight fraction of material having molecular weight $M_i$ and $\Sigma n_i$=total number of molecules.

Weight average molecular weight, $M_w$, is calculated in the usual manner according to the following formula: $M_w=\Sigma w_i*M_i$, where $w_1$ and $M_i$ are the weight fraction and molecular weight, respectively, of the $i^{th}$ fraction eluting from the GPC column. The ratio of these two averages, the molecular weight distribution (MWD or $M_w/M_n$), is used herein to define the breadth of the molecular weight distribution.

Vicat softening point is determined in accordance with ASTM D1525.

Volume averaged particle size analysis is performed with the Beckman Coulter LS 13320 Laser Light Scattering Particle Sizer (Beckman Coulter Inc., Fullerton, California) using the standard procedure, with results reported in microns.

DETAILED DESCRIPTION

The present disclosure relates to a water-based pressure-sensitive adhesive composition. In an embodiment, the water-based pressure-sensitive adhesive composition includes (A) an acrylic dispersion composed of (i) an acrylic-based polymer with a glass transition temperature (Tg) less than −20° C., and (ii) a surfactant. The water-based pressure-sensitive adhesive composition also includes (B) an ethylene acid dispersion. The ethylene acid dispersion is composed of (i) an ethylene acid copolymer and (ii) a dispersant or a neutralizing agent. The ethylene acid copolymer contains from 3 wt % to less than 50 wt % acid comonomer and has a melt index from 1 g/10 min to 100 g/10 min. The ethylene acid copolymer is in the form of particles.

A. Acrylic Dispersion

The water-based PSA composition includes an acrylic dispersion. The term "water-based PSA composition" is a pressure sensitive adhesive composition wherein water is the continuous phase, i.e., a composition having an aqueous medium. The acrylic dispersion includes one or more acrylic-based monomers, a surfactant, and water to the exclusion of an ethylene-based polymer. The surfactant acts as an emulsifier and enables droplets of the acrylic-based monomer, which is hydrophobic, to form throughout the aqueous medium. An initiator is then introduced into the emulsified mixture. The initiator reacts with the acrylic-based monomer(s) dispersed throughout the aqueous medium until all, or substantially all, of the acrylic-based monomer(s) is polymerized. The end result is an acrylic dispersion composed of a dispersion of acrylic-based polymer particles in the aqueous medium, the acrylic-based polymer particles composed of one or more acrylic-based monomer subunits to the exclusion of ethylene-based polymer.

The acrylic-based polymer has a Tg less than −20° C., or from −80° C. to −20° C., or from −70° C. to −30° C., or from −60° C. to −40° C. and a Mw from greater than 100,000 daltons to 10,000,000 daltons. Nonlimiting examples of suitable acrylic-based monomers include acrylic acid (AA), butyl acrylate (BA), ethylhexyl acrylate (2-EHA), ethyl acrylate (EA), methyl acrylate (MA), butyl methacrylate (BMA), octyl acrylate, isooctyl acrylate, decyl acrylate, isodecyl acrylate, lauryl acrylate, cyclohexyl acrylate, methyl methacrylate (MMA), isobutyl methacrylate, octyl methacrylate, isooctyl methacrylate, decyl methacrylate, isodecyl methacrylate, lauryl methacrylate, pentadecyl methacrylate, stearyl methacrylate, n-butyl methacrylate, $C_{12}$ to $C_{18}$ alkyl methacrylates, cyclohexyl methacrylate, methacrylic acid, and combinations thereof. In addition to acrylic-based monomer, the acrylic-based polymer may also include monomer such as 2-hydroxyethyl acrylate (2-HEA), styrene (STY), vinyl ester, vinyl acetate, and combinations thereof.

The acrylic-based dispersion includes a surfactant. Nonlimiting examples of suitable surfactant include cationic surfactants, anionic surfactants, zwitterionic surfactants, non-ionic surfactants, and combinations thereof. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants, such as ethoxylated alcohol, ethoxylated fatty acid, sorbitan derivative, lanolin derivative, ethoxylated nonyl phenol, or alkoxylated polysiloxane. Commercially-available examples of suitable surfactants include, but are not limited to, surfactants sold under the trade names TERGITOL™ and DOWFAX™ by The Dow Chemical Company, such as TERGITOL™ 15-S-9 and DOWFAX™ 2A1, and products sold under the DISPONIL trade name by BASF SE, such as DISPONIL FES 77 IS and DISPONIL FES 993.

The initiator can be either a thermal initiator or a redox system initiator. Examples of the thermal initiator include, but are not limited to, ammonium persulfate, sodium persulfate, and potassium persulfate. When the initiator is a redox system initiator, the reducing agent can be, for example, an ascorbic acid, a sulfoxylate, or an erythorbic acid, while the oxidating agent can be, for example, a peroxide or a persulfate.

In an embodiment, the acrylic dispersion includes particles of an acrylic-based polymer having the following properties:

(i) two or more monomer subunits selected from any combination of 2-EHA, MA, MMA, STY, 2-HEA, AA, BA, EA, VA, and BMA; and (ii) a Tg from −60° C. to −30° C.

In an embodiment, the acrylic dispersion includes particles of an acrylic-based polymer having the following properties:

(i) monomer subunits of 2-EHA, EA, MMA, and AA; and (ii) a Tg from −60° C. to −30° C.

In an embodiment, the acrylic dispersion includes particles of an acrylic-based polymer having the following properties:

(i) monomer subunits of 2-EHA, MMA, STY, 2-HEA, AA, and BA; and (ii) a Tg from −60° C. to −30° C.

B. Ethylene Acid Dispersion

The water-based PSA composition includes an ethylene acid dispersion. The ethylene acid dispersion includes (i) particles of an ethylene acid copolymer, (ii) a dispersant or a neutralizing agent, and (iii) water. The ethylene acid copolymer has from 3 wt % to less than 50 wt % acrylic-based comonomer, the ethylene acid copolymer having a melt index from 1 g/10 min to 100 g/10 min.

An "ethylene acid copolymer," (interchangeably referred to as "EAC") as used herein, includes copolymerized comonomers of (a) ethylene; (b) from 3 wt % to less than 50 wt % of at least one $C_3$ to $C_8$ α,β ethylenically unsaturated carboxylic acid; and, optionally, (c) from 10 wt % to 30 wt % of at least one $C_3$ to $C_8$ α,β ethylenically unsaturated carboxylic acid ester, based on the total weight of monomers present in the ethylene acid copolymer.

The α,β-ethylenically unsaturated $C_3$ to $C_8$ carboxylic acid, component (b) includes, for example, acrylic acid, methacrylic acid, itaconic acid, crotonic acid (trans-butenoic acid), isocrotonic acid (cis-butenoic acid), vinylacetic acid, (E)-4-methoxy-4-oxo-but-2-enoic acid, (Z)-4-ethoxy-4-oxo-but-2-enoic acid, vinyllactic acid, maleic acid, 2-methylmaleic acid or aconitic acid; or mixtures thereof. In an embodiment, the $C_3$ to $C_8$ α,β ethylenically unsaturated carboxylic acid is acrylic acid, methacrylic acid, or a combination of acrylic acid and methacrylic acid.

The ethylene acid copolymer may optionally include $C_3$ to $C_8$ α,β ethylenically unsaturated carboxylic acid ester, component (c). When the $C_3$ to $C_8$ α,β ethylenically unsaturated carboxylic acid ester component (c) is present, component (c) may include monoesters or, in some examples, diesters of α,β-unsaturated dicarboxylic acids with primary, secondary and/or tertiary saturated monohydric alcohols having from 1 carbon atom to 20 carbon atoms. The acid esters may be, for example, methyl, ethyl, propyl, butyl or the 2-ethylhexyl esters of acrylic acid, of methacrylic acid and/or itaconic acid, or the corresponding monoesters or diesters of maleic acid, fumaric acid or citraconic acid.

Acrylic acid and methacrylic acid have respective Structure (II) and Structure (III) below:

Structure (II)

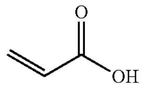

Structure (III)

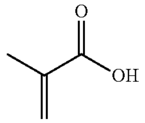

In an embodiment, the EAC consists of (i) ethylene, (ii) from 3 wt % to less than 50 wt % of an acrylic acid comonomer and/or a methacrylic acid comonomer, and (iii) optionally a termonomer. Nonlimiting examples of suitable termonomer include one or more $C_3$-$C_8$ α-olefin, vinyl acetate, esters of acrylic acid or methacrylic acid such as methyl acrylate, ethyl acrylate, and butyl acrylate, and combinations thereof. When present, the amount of termonomer in the EAC is from greater than 0 wt % to less than 30%, or from 1 wt % to 10 wt %, or from 3 wt % to 8 wt %, with weight percent based on the total weight of the EAC. When the termonomer is present, it is understood the total weight percent of (i) units derived from ethylene, (ii) units derived from acrylic acid and/or methacrylic acid comonomer and (iii) units derived from the termonomer amount to 100 wt % EAC.

In an embodiment, the ethylene acid dispersion includes particles of an EAC that is an ethylene copolymer consisting of (i) ethylene and (ii) acrylic acid comonomer or methacrylic acid comonomer.

In an embodiment, the ethylene acid dispersion includes particles of an EAC consisting of (i) ethylene and (ii) acrylic acid comonomer or methacrylic acid comonomer. The EAC contains from 3 wt % to less than 50 wt %, or from 9 wt % to 30 wt %, or from 9 wt % to 25 wt %, or from 9 wt % to 20 wt % of acrylic acid comonomer or methacrylic acid comonomer. Weight percent is based on the total weight of the EAC. It is understood that the particles of the EAC are distinct from the particles of the acrylic-based polymer present in the acrylic dispersion.

In an embodiment, the EAC is an ethylene copolymer consisting of (i) ethylene and (ii) from 3 wt % to less than 50 wt % acrylic acid comonomer or methacrylic acid comonomer and the EAC has (i) a number average molecular weight (Mn) from 8.0 kiloDalton (kDa) to 30 kDa, or from 9 kDa to 25 kDa, or from 10 kDa to 20 kDa and (ii) a weight average molecular weight (Mw) from 4.5 kDa to 100 kDa, or from 4.8 kDa to 50 kDa.

The EAC has a melt index (MI) from 1.0 g/10 min to 100 g/10 min, or from 5 g/10 min to 95 g/10 min, or from 10.0 g/10 min to 95 g/10 min, or from 50 g/10 min to 95 g/10 min.

The EAC has a density from 0.920 g/cc to 0.960 g/cc, or from 0.930 g/cc to 0.960 g/cc, or from 0.930 g/cc to 0.950 g/cc.

The EAC has a melting point, Tm, from 70° C. to 110° C., or from 90° C. to 100° C., or from 90° C. to 97° C., or from 90° C. to 95° C.

The EAC has a Vicat softening point from 48° C. to 95° C., or from 55° C. to 95° C., or from 60° C. to 70° C., or from 60° C. to 65° C.

The water-based pressure-sensitive adhesive composition has particles of EAC with a volume average particle size from 10 nm, or 25 nm, or 50 nm, or 80 nm, or 100 nm, or 250 nm to 500 nm, or from 750 nm, or from 800 nm, or less than 1100 nm. In an embodiment, the composition has particles of EAC with a volume average particle size from 50 nm to less than 1000 nm, or from 75 to 900 nm, or from 80 nm to 800 nm.

In an embodiment, the ethylene acid dispersion includes particles of EAC consisting of (i) ethylene and (ii) acrylic acid comonomer, and having one, some, or all of the following properties:

(i) an acrylic acid content from 3 wt % to 20 wt %, or from 11 wt % to 15 wt %; and/or
(ii) an Mn from 7.5 kDa to 20 kDa, or from 9 kDa to 15.5 kDa; and/or
(iii) an Mw from 25.5 kDa to about 150 kDa, or from 45 kDa to about 95 kDa; and/or
(iv) an MI from 1 g/10 min to 100 g/10 min; and/or
(v) a volume average particle size from 50 to 1000 nm, or from 80 nm to 800 nm; and/or
(vi) a density from 0.930 g/cc to 0.950 g/cc, or from 0.935 g/cc to 0.945 g/cc; and/or
(vii) a melting point, Tm, from 80° C. to 110° C., or from 90° C. to 95° C.; and/or
(viii) a Vicat softening point from 55° C. to 95° C., or from 60° C. to 65° C.

In an embodiment, the ethylene acid dispersion includes particles of EAC consisting of (i) ethylene and (ii) methacrylic acid comonomer, and having one, some, or all of the following properties:

(i) an methacrylic acid content from 3 to 20 wt %, or from 11 to 15 wt %; and/or
(ii) an Mn from 8 kDa to 20 kDa, or from 9 kDa to 15 kDa; and/or
(iii) an Mw from 4.5 kDa to 70 kDa, or from 4.5 kDa to 50 kDa; and/or
(iv) an MI from 1 g/10 min to 100 g/10 min, or from 50 g/10 min to 95 g/10 min; and/or
(v) a volume average particle size from 50 to 1000 nm, or from 80 nm to 800 nm; and/or
(vi) a density from 0.930 g/cc to 0.950 g/cc, or from 0.935 g/cc to 0.945 g/cc; and/or
(vii) a melting point, Tm, from 90° C. to 110° C., or from 90° C. to 95° C.; and/or
(viii) a Vicat softening point from 55° C. to 95° C., or from 60° C. to 65° C.

Nonlimiting examples of suitable EAC include products sold under the trade names NUCREL™, available from The Dow Chemical Company, and PRIMACOR™, available from SK Global.

In an embodiment, the water-based pressure-sensitive adhesive composition includes from 0.1 to 25 wt %, or from 0.1 to 10 wt %, or from 0.2 to 6 wt %, or from 0.3 to 4 wt % of the EAC, based on the total dry weight of the water-based pressure-sensitive adhesive composition.

In an embodiment, the ethylene acid dispersion includes composite particles composed of a first EAC and of a second EAC, wherein the second EAC is different than the first EAC. The second EAC is "different than" the first EAC by way of a different EAC property (comonomer type/content, Mn, Mw, MI, density, Tm, and/or Vicat softening point). The composite particles composed of the first EAC and the second EAC have a volume average particle size from 0.05 micron to 4.0 microns, or from 0.1 microns to 3.5 microns, or from 0.75 micron to 3.0 microns. The ratio of the weight of the first EAC to the second EAC in the composite particles is from 90:10 to 10:90, or from 75:25 to 25:75, or from 60:40 to 40:60, or 50:50 based on the total weight of all composite particles present in the ethylene acid dispersion.

The ethylene acid dispersion includes a dispersant and/or a neutralizing agent. The dispersant may be present alone, or in combination with, the neutralizing agent. Alternatively, the neutralizing agent may be present alone, or in combination with, the dispersant.

In an embodiment, the ethylene acid dispersion includes the dispersant. The dispersant provides colloidal stability for the EAC copolymer while in the EAC dispersion. The dispersant is selected from a long chain fatty acid having from 14 to 40 carbon atoms, an anionic surfactant, a cationic surfactant, a nonionic surfactant, a polyethylene with acid functionality, a polypropylene with acid functionality, and combinations thereof. In an embodiment, the dispersant is a long chain fatty acid having from 14 to 40 carbon atoms, or from 16 to 36 carbon atoms, or from 18 to 24 carbon atoms and optionally neutralized with a base such as potassium hydroxide, sodium hydroxide, ammonium hydroxide, and/or dimethylethanolamine. Nonlimiting examples of long chain fatty acids suitable for the dispersant include lauric acid ($C_{12}$), palmitic acid ($C_{16}$), oleic acid ($C_{18}$) stearic acid ($C_{18}$), arachidic acid ($C_{20}$), euricic acid ($C_{22}$), behenic acid ($C_{22}$), and combinations thereof.

In an embodiment, the dispersant is an anionic surfactant. Nonlimiting examples of anionic surfactants suitable for the dispersant include sodium lauryl ether sulfonate, sodium dodecylbenzene sulfonate, sodium $C_{14}$-$C_{16}$ alpha olefin sulfonate, and DOWFAX™ 2A1 available from The Dow Chemical Company.

In an embodiment, the dispersant is a cationic surfactant. Nonlimiting examples of cationic surfactants suitable for the dispersant include stearamidopropyl dimethylamine.

In an embodiment, the dispersant is a nonionic surfactant. Nonlimiting examples of nonionic surfactants suitable for the dispersant include poly(ethylene glycol)-block-poly(propylene glycol)-block-poly(ethylene glycol) and poly(ethylene glycol) alkyl ethers.

In an embodiment, the dispersant is polyethylene or polypropylene with acid functionality. Nonlimiting examples of polyethylene or polypropylene with acid functionality include ethylene copolymers with acrylic acid, methacrylic acid, maleic acid, or maleic anhydride. In an embodiment, the polyethylene or polypropylene with acid functionality is neutralized with a base such as potassium hydroxide, sodium hydroxide, ammonium hydroxide, and/or dimethylethanolamine.

In an embodiment, the ethylene acid dispersion includes the neutralizing agent. A "neutralizing agent," as used herein, is a base which reacts with the acid functionality in the EAC in an acid-base reaction to form a salt. When present, the neutralizing agent is used to control pH and provide stability to the formulated pressure sensitive adhesive composition. The neutralizing agent is present in an amount from greater than 0 wt % to 2 wt %, or from 0.1 wt % to 1.5 wt % based on total dry weight of the water based pressure-sensitive adhesive composition.

In an embodiment, neutralization of the EAC, is from 25% to 200% on a molar basis; or from 50% to 150% percent on a molar basis, or from 50% to 120% on a molar basis; or or from 50% to 110% percent on a molar basis. Nonlimiting examples of suitable neutralizing agents include hydroxides, carbonates, hydrogen carbonates, amines, and combinations thereof.

Nonlimiting examples of suitable hydroxides include ammonium hydroxide, potassium hydroxide, lithium hydroxide, and sodium hydroxide.

Nonlimiting examples of suitable carbonates include sodium carbonate, sodium bicarbonate, potassium carbonate, and calcium carbonate.

Nonlimiting examples of suitable amines include aqueous ammonia, monoethanolamine, diethanolamine, triethanolamine, ammonia, monomethylamine, dimethylamine, trimethylamine, 2-amino-2-methyl-1-propanol, triisopropanola mine, diisopropanola mine, N,N-dimethylethanolamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1,2-diaminopropane, 2-amino-2-hydroxymethyl-1,3-propanediol, N,N'-ethylenebis[bis(2-hydroxypropyl)amine]toluene-p-sulphonate, or cyclic amines such as morpholine, piperazine, piperidine, and combinations thereof.

C. Tackifier

In an embodiment, the water-based pressure sensitive adhesive composition includes a tackifier. Suitable tackifiers include, but are not limited to, rosin resins including rosin acid and/or rosin ester obtained by esterifying rosin acid with alcohols or an epoxy compound and/or its mixture, non-hydrogenated aliphatic $C_5$ resins, hydrogenated aliphatic $C_5$ resins, aromatic modified $C_5$ resins, terpene resins, hydrogenated $C_9$ resins, (meth)acrylic resins, and combinations thereof. (Meth)acrylic resins suitable as tackifiers are described in references U.S. Pat. No. 4,912,169, US 2002/055587, and U.S. Pat. No. 9,605,188. The water-based pressure-sensitive adhesive composition contains from greater than 0 wt % to 50 wt %, or from 5 wt % to 40 wt %, or from 7 wt % to 30 wt %, or from 8% to 15 wt % of the tackifier based on total dry weight of the water-based pressure sensitive adhesive composition.

D. Additives

The water-based pressure sensitive adhesive composition may further include one or more optional additives. When the additive is present, nonlimiting examples of suitable additives include thickener, defoamer, wetting agent, mechanical stabilizer, pigment, filler, freeze-thaw agent, neutralizing agent, plasticizer, adhesion promoter, and combinations thereof.

In an embodiment, the water-based pressure sensitive adhesive composition includes from greater than 0 wt % to 5 wt % thickener, based on the total dry weight of the water-based pressure sensitive adhesive composition. Suitable thickeners include, but are not limited to, ACRYSOL™, UCAR™ and CELLOSIZE™ which are commercially available from The Dow Chemical Company, Midland, Michigan.

In an embodiment, the water-based pressure-sensitive adhesive composition includes from greater than 0 wt % to 2 wt % of a neutralizing agent, based on the total dry weight of the water-based pressure-sensitive adhesive composition. The neutralizing agent is used to control pH and provide stability to the formulated pressure sensitive adhesive composition. Suitable neutralizing agents include, but are not limited to, aqueous ammonia, aqueous amines, and other aqueous inorganic salts.

E. PSA Composition

The water-based PSA composition contains (A) from 40 wt % to 99.9 wt %, or from 93 wt % to 99.8 wt %, or from 95 wt % to 99.7 wt % of the acrylic-based dispersion;

(B) from 10 wt % to 0.1 wt %, or from 7 wt % to 0.2 wt %, or from 5 wt % to 0.3 wt % of the ethylene-based polymer dispersion; and (C) 0 wt %, or from greater than 0 wt % to 50 wt %, or from 5 wt % to 40 wt %, or from 7 wt % to 30 wt %, or from 8% to 15 wt % tackifier, wherein weight percent is based on the total dry weight of the water-based pressure-sensitive adhesive composition. It is understood that the aggregate dry weight of components (A), (B), and (C) amount to 100 dry wt %.

F. Article

The present disclosure provides an article. The article includes a first substrate and a layer of a water-based PSA composition on the first substrate (hereafter PSA layer). The water-based PSA composition is any water-based PSA composition as previously disclosed herein and includes the acrylic dispersion (A) composed of particles of (i) the acrylic-based polymer with a glass transition temperature (Tg) less than −20° C., and (ii) the surfactant; the ethylene acid dispersion (B) composed of (i) particles of an ethylene acid copolymer and (ii) a dispersant or a neutralizing agent and (C) optional tackifier. The ethylene acid copolymer contains from 3 wt % to 50 wt %, or from 10 wt % to 20 wt %, or from 11 wt % to 15 wt % of the acid comonomer and has a melt index from 1 g/10 min to 100 g/10 min.

In an embodiment, the article is a pressure sensitive adhesive article. A "pressure sensitive adhesive article," as used herein, is an article in which a pressure sensitive adhesive (PSA) is adhered to a first substrate, the PSA having an "available surface," the available surface being an exposed surface, available to make contact with a second substrate. The "available surface" is composed of any water-based PSA composition as previously disclosed herein. The available surface of the PSA may or may not be in contact with a release material. A "release material," as used herein, is a material that forms a weak bond with the PSA, such that the PSA may be readily removed by hand to expose the available surface.

The article includes a first substrate. The first substrate is a film, a cellulose-based material, a fabric, a tape, or a release liner, and combinations thereof.

In an embodiment, the first substrate is a film. Nonlimiting examples of films suitable for the first substrate include plastic films (unstretched film, or uniaxially stretched film, or biaxially stretched film) such as propylene-based polymer film, ethylene-based polymer film, ethylene/propylene copolymer films, polyester films, poly(vinyl chloride) films, metallized films, foam substrates such as polyurethane foams, and polyethylene foams; and metal foils such as aluminum foils or copper foils.

In an embodiment, the first substrate is a cellulose-based material. Nonlimiting examples of cellulose-based material suitable for the substrate include paper such as craft paper, crepe paper and Japanese paper, labels, and cardboard.

In an embodiment, the first substrate is a fabric. Nonlimiting examples of fabric suitable for the substrate included cotton fabrics, staple-fiber fabrics, nonwoven fabrics such as polyester nonwoven fabrics, vinyl on nonwoven fabrics, and combinations thereof.

In an embodiment, the first substrate is a release liner. Nonlimiting examples of suitable materials for the release liner include fluorocarbon polymers (e.g., polytetrafluoroethylene, polychlorotrifluoro-ethylene, polyvinyl fluoride, polyvinylidene fluoride, a tetrafluoroetylene-hexafluoropropylene copolymer, a chlorofluoroethylene-vinylidene fluoride copolymer, etc.), siliconized paper or film, and non-polar polymers (e.g., olefin-based resins such as ethylene-based polymers and propylene-based polymers.

In an embodiment, the thickness of the first substrate (film, cellulose-based material, fabric, tape, or release liner) is from 10 microns to 10000 microns, or from 10 microns to 1000 microns, or from 20 microns to 500 microns, or from 50 microns to 100 microns, or from 100 microns to 200 microns, or from 200 microns to 500 microns.

The PSA layer is formed by applying, on one, or both, first substrate surface(s), the water-based PSA composition, followed by drying or curing. The water-based PSA composition can be any water-based PSA composition as previously disclosed herein. For the application of the PSA composition a coater, e.g., a gravure roll coater, a reverse roll coater, a kiss roll coater, a dip roll coater, a bar coater, a knife coater, a spray coater, curtain coater, slot die coater, comma coater, knife coater or the like, can be employed. In an embodiment, the surface(s) of the substrate to which the pressure-sensitive adhesive layer is applied is/are subjected to a surface treatment. Nonlimiting examples of suitable surface treatments include a primer coating, and a corona discharge treatment prior to application of the PSA layer onto the substrate surface(s).

In an embodiment, the thickness of the PSA layer on the substrate surface is from 1 micron to 500 microns, or from 10 microns to 110 microns, or from 30 microns to 90 microns, or from 1 micron to 10 microns, or from 10 microns to 50 microns.

In an embodiment, the article is a multi-layer PSA article. A "multi-layer PSA article," as used herein, includes a substrate and two or more PSA layers such that a first PSA layer is in contact with the substrate and a second PSA layer is in contact with the first PSA layer. The multi-layer PSA article may include additional PSA layers wherein each additional PSA layer is in contact with a preceding PSA layer, the PSA layers arranged in a stacked manner. For example, the multi-layer PSA article can include a third PSA layer, the third PSA layer in contact with, and stacked upon, the second PSA layer. The multi-layer PSA article can include a fourth PSA layer, the fourth PSA layer in contact with, and stacked upon, the third PSA layer. The multi-layer PSA article can include a fifth PSA layer, the fifth PSA layer in contact with, and stacked upon, the fourth PSA layer. At least one of the PSA layers of the multi-layer PSA article is composed of any water-based PSA composition as previously disclosed herein.

By way of example, and not limitation, some embodiments of the present disclosure will now be described in detail in the following Examples.

EXAMPLES

Materials used in the examples are provided in Table 1A and 1B below.

TABLE 1A

Materials used in the comparative samples (CS) and inventive examples (IE)

| Material/Description | Properties | Source |
|---|---|---|
| COHESA 3050 | Acrylic dispersion An oil-in-water dispersion of an ethylene acrylic acid copolymer ("EAA") having active solids of 38.5-41.4%, and a viscosity of less than or equal to about 100 cps (Brookfield viscosity at 25° C.) | Honeywell International, Inc. |
| TERGITOL ™ 15-S-9 | Nonionic surfactant | The Dow Chemical Company |
| AEROSOL OT-75 | Anionic surfactant | Cytec Solvay Group |
| DISPONIL FES 77 | Anionic surfactant | BASF SE |
| SURFYNOL 440 | Nonionic dynamic wetting agent | Evonik |
| ACRYSOL ™ RM-2020 | Rheology modifier/ thickener | The Dow Chemical Company |
| Sodium carbonate, ammonium persfulate, tert-butyl hydroperoxide, sodium formaldehyde bisulfite, n-dodecyl mercaptan | Various chemicals | Sinoreagent Company |
| 2-ethylhexyl acrylate ("2-EHA"), ethyl acrylate ("EA"), methyl methacrylate ("MMA"), acrylic acid ("AA"), butyl acrylate ("BA") | Acrylic dispersion monomers | The Dow Chemical Company |
| Oleic acid | Dispersant $C_{18}H_{34}O_2$, 282.5 g/mol d = 0.89 g/cc 90% purity reagent grade | Sigma-Aldrich |
| PRIMACOR ™ 5980i | Dispersant Melt index 300 | SK Global Chemical |
| PRIMACOR ™ 1410 | EAA resin | SK Global Chemical |
| PRIMACOR ™ 3440 | EAA resin | SK Global Chemical |

TABLE 1B

| EMAA and EAA resins. | | | | | | |
|---|---|---|---|---|---|---|
| | Density ($g/cm^3$) | DSC Melt Point, (Tm) (° C.) | Vicat Softening Point (Vsp) (° C.) | MI | % MAA* | % AA† |
| NUCREL ™ 960 | 0.94 | 91 | 62 | 60 | 15 | 0 |
| NUCREL ™ 699 | 0.94 | 94 | 65 | 95 | 11 | 0 |
| NUCREL ™ 903 | 0.93 | 101 | 81 | 2.5 | 9 | 0 |
| NUCREL ™ 925 | 0.94 | 92 | 67 | 25 | 15 | 0 |
| NUCREL ™ 2806 | 0.944 | 83‡ | 48 | 60 | 0 | 18 |
| PRIMACOR ™ 1410 | 0.938 | 97.8 | 81.1 | 1.5 | 0 | 9.7 |
| PRIMACOR ™ 3440 | 0.938 | 98 | 76 | 10 | 0 | 9.7 |

*Weight percent methacrylic acid comonomer based on total weight EMAA resin
†Weight percent acrylic acid comonomer based on total weight EAA resin
‡Data obtained from US 20160145806A1.

TABLE 1C

| Dispersions of EMAA and EAA resins | | | |
|---|---|---|---|
| | EMAA or EAA | Weight % of each EAC for blends | Particle Size (nm) |
| EMAA 1 | NUCREL ™ 960 | — | 80 |
| EMAA 2 | NUCREL ™ 699/ NUCREL ™ 960 | 75/25 | 100 |
| EMAA 3 | NUCREL ™ 699/ NUCREL ™ 960 | 75/25 | 800 |
| EMAA 4 | NUCREL ™ 903 | — | 570 |
| EMAA 5 | NUCREL ™ 925 | — | 493 |
| EMAA 6 | NUCREL ™ 925/ NUCREL ™ 960 | 75/25 | 543 |
| EAA 1 | PRIMACOR ™ 1410 | — | 223 |
| EAA 2 | NUCREL ™ 2806 | — | 500 |
| EAA 3 | PRIMACOR ™ 3440 | — | 1.080 |

A. Melt Index (MI)-Melt Viscosity (Mv) Relationship

Melt Index at 190° C. may be estimated from Melt Viscosity at 140° C. according to the following calculation taken from Shenoy, A. V.; Saini, D. R.; Nadkarni, V. M. *Polymer* 1983, 24, 722-728. MI at a given temperature, e.g., 140° C., may be estimated from Melt Viscosity at the same temperature as follows:

$$MI = \frac{49{,}800 \times \rho \times L}{\text{Melt Viscosity}}$$

where MI is given in g/10 min, ρ is the polymer density in $g/cm^3$, L is the weight used in the MI measurement in kg (typically 2.16 kg), and the melt viscosity is given in poise.

Next, a rearrangement of the form of the Williams-Landel-Ferry equation provided by Shenoy et al. in the above reference may be used to estimate the MI at one temperature, $MI(T_2)$ e.g., 190° C., from the MI at another temperature, $MI(T_1)$ e.g. 140° C.:

$$MI(T_2) = MI(T_1) \times 10^{\left(\frac{8.86(T_2 - T_s)}{101.6 + (T_2 - T_s)} - \frac{8.86(T_1 - T_s)}{101.6 + (T_1 - T_s)}\right)}$$

where $T_s$ is the standard reference temperature which is the polymer glass transition temperature plus 50 K, $T_2$ is the temperature in K at which MI is to be calculated, and $T_1$ is the temperature in K at which the MI is known. If the polymer glass transition temperature is not known, it may be estimated using the Fox equation from the glass transition temperature of the homopolymers of the component monomers:

$$\frac{1}{T_g} = \sum \frac{w_i}{T_{g.i}}$$

where $T_g$ is the estimated $T_g$ of the desired copolymer, $w_i$ is the weight fraction of the i-th component monomer in the desired copolymer, and $T_{g,i}$ is the glass transition temperature of the homopolymer of the i-th component monomer.

As an example, the MI at 190° C. for the EAA Honeywell A-C 5120 polymer may be estimated from its melt viscosity at 140° C. (6 poise), density (0.93 $g/cm^3$), and glass transition temperature calculated for a copolymer of 85% ethylene and 15% acrylic acid.

TABLE 1D

| MI-Mv relationship for various dispersion components | | | | | | | | | |
|---|---|---|---|---|---|---|---|---|---|
| Type | Name | E | VA | AA | Melt Viscosity 140° C. | MI 140° C. | ρ | $T_g$ (K, calculated) | MI 190° C. (calculated) |
| EAA | Honeywell A-C 5120 | 85% | | 15% | 6 | 16673 | 0.93 | 208 | 62309 |
| Oxidized EVA | Honeywell A-C 645P* | 94% | 6% | | 3.75 | 26964 | 0.94 | 201 | 92657 |
| Oxidized PE | Honeywell A-C 655 | 100% | | | 2.1 | 47637 | 0.93 | 193 | 156040 |
| Oxidized PE | Honeywell A-C 656 | 100% | | | 1.85 | 53493 | 0.92 | 193 | 175222 |
| EVA | Honeywell A-C 405 | 91.5% | 8.5% | | 6 | 16494 | 0.92 | 211 | 63329 |
| EAA | Honeywell A-C 540 | 95% | | 5% | 5.75 | 17398 | 0.93 | 198 | 59286 |
| EAA | Honeywell A-C 580 | 90% | | 10% | 6.5 | 15473 | 0.935 | 203 | 55084 |
| EAA | Honeywell A-C 5180 | 80% | | 20% | 6.25 | 16092 | 0.935 | 214 | 63491 |

TABLE 1D-continued

| MI-Mv relationship for various dispersion components | | | | | | | | | | |
|---|---|---|---|---|---|---|---|---|---|---|
| Type | Name | E | VA | AA | Melt Viscosity 140° C. | MI 140° C. | ρ | $T_g$ (K, calculated) | MI 190° C. (calculated) |
| EAA | PRIMACOR 5990 | 80% | | 20.5% | n/a | n/a | 0.955 | n/a | 1300 |
| EAA | PRIMACOR 5980 | 80% | | 20.5% | n/a | n/a | 0.96 | n/a | 300 |

*Monomer composition estimated, wt % based on total weight of material
E-ethylene,
VA-vinyl acetate,
AA-acrylic acid 1. Preparation of Acrylic Dispersion A. Acrylic Dispersion 1

Acrylic dispersion 1 is prepared according to the following procedure. A four liter, five-neck reactor equipped with a condenser, a mechanical stirrer, a temperature-controlled thermocouple and inlets for initiators and monomers, is fed with 540 g of deionized ("DI") water and heated to 87° C. under a gentle nitrogen flow. In a separate container, a monomer emulsion is prepared by mixing 400 g of DI water, 11.9 g of DISPONIL FES 77, 5 g of TERGITOL™ 15-S-9, 4 g of sodium carbonate, and 2,024 g of a monomer mixture composed of 71.5 wt % of 2-ethylhexyl acrylate ("2-EHA"), 18.5 wt % of ethyl acrylate ("EA"), 9 wt % of methyl methacrylate ("MMA"), and 1 wt % of acrylic acid ("AA"). Next, a solution of a mixture of 1.3 g of sodium carbonate and 8.3 g of ammonium persulfate ("APS" as initiator) in 32 g DI water is added into the reactor. Immediately after addition of the solution of sodium carbonate and APS, the monomer emulsion is fed into the reactor. The feeding proceeds for 80 minutes. Upon completion of the monomer emulsion addition, the reaction mixture is cooled to 60° C. before gradual addition of a solution of tert-butyl hydroperoxide (70%) ("t-BHP") (4.7 g in 23 g DI water) and 2.8 g of sodium formaldehyde bisulfite in 28 g DI water, via two separate feeds over 25 minutes. Upon completion of the feeds, the reaction is cooled to room temperature. The obtained acrylic dispersion 1 is then filtered through 325 mesh filter cloth to prepare the composition for subsequent evaluation work. The obtained acrylic dispersion 1 includes an acrylic-based polymer composed of 71.5 wt % 2-EHA/18.5 wt % EA/9 wt % MMA/1 wt % AA, and has a glass transition temperature of −41° C. Weight percent is based on the total dry weight of the acrylic-based polymer.

B. Acrylic Dispersion 2

Acrylic Dispersion 2 is INVISU™ 4100 available from The Dow Chemical Company.

C. Acrylic Dispersion 3

Acrylic Dispersion 3 is INVISU™ 3000 available from The Dow Chemical Company.

D. Acrylic Dispersion 4

A flask set up for semi-continuous emulsion polymerization containing 270 g of water at 90° C. was charged first with sodium peroxodisulfate (1.26 g) in 13 g deionized water and second with 21.2 g of a seed consisting of an aqueous dispersion of an acrylic polymer with mean particle diameter 60 nm at 12% solids content. After two minutes, addition of a feed stream containing sodium peroxodisulfate (3.79 g) in 59.8 g deionized water and a monomer emulsion was begun and continued at a constant rate over 120 minutes at 90° C. The monomer emulsion consisted of 1250 g of monomers in proportions by weight according to Table 2, 180 g of a 33% concentration solution of a sulfuric ester sodium salt of lauryl alcohol ethoxylated by 30 moles of ethylene oxide in water, 5.6 g of a 44% strength solution of DOWFAX™ 2A1 in water, 6.7 g of a 75% concentration solution of dioctylsulfosuccinate sodium salt in ethanol/water, and 295 g of deionized water. After half of the weight of the monomer emulsion was added to the reactor, 72 g of a seed consisting of an aqueous dispersion of an acrylic polymer with mean particle diameter 60 nm at 26% solids content was charged to the reactor within one minute. After the monomer emulsion and the feed stream were fully added to the reactor, an additional 35 g of deionized water was added while the reactor temperature was maintained at 90° C. Next, ammonia (17.9 g of 4.4% concentration in water) was added to the reactor. Finally, a solution of 8% tert-butyl hydroperoxide in water (23 g) and a solution of 10% sodium formaldehyde sulfoxylate in water (19.5 g) were added to the reactor at 90° C. at a constant rate over 60 minutes. After the completion of these feed streams, the reactor contents were cooled to room temperature.

E. Acrylic Dispersion 5

Using a flask equipped with a mechanical stirrer, an initial aqueous charge composed of 0.51 grams tetrasodium pyrophosphate, 640 grams of deionized water, 1.80 grams anhydrous sodium sulfate, and 1.36 grams ascorbic acid is warmed to 87° C. Next, 28.4 grams of 19% concentration sodium persulfate in water is poured into the flask. Over a period of 2.0 hours, an emulsion made up of 14.7 grams of 50% strength aqueous sodium hydroxide solution, 39.4 grams of a 30% concentration solution of a sulfuric ester sodium salt of lauryl alcohol ethoxylated by 12 moles of ethylene oxide in water, 21.2 grams of 25.0% concentration sodium vinyl sulfonate solution in water, 28.8 grams of a 22% strength solution of sodium dodecylbenzene sulfonate in water, 6.6 grams of itaconic acid, 236 grams of water, 321.2 grams of methyl methacrylate, 55.2 grams of styrene, 1,592.4 grams of 2-ethylhexyl acrylate, 679.3 grams of ethyl acrylate, and 14.4 grams of acrylic acid is gradually fed into the flask. At the outset, the rate of addition is 5.0 grams per minute for the first 5.0 minutes. It is then raised steadily to 25.0 grams per minute over the span of 35 minutes. After 75 minutes of total feed time, the rate is raised to 35.0 grams per minute. From the outset of the emulsion feed, 94 grams of a sodium peroxodisulfate solution at 11% strength in water is added at a constant rate over 2.3 hours, and the reactor temperature is kept at 85 to 87° C.

After the completion of the feeds and at roughly 70° C., a solution of 2.76 grams sodium bisulphite, 1.8 grams acetone and 44.4 grams water, and, at the same time, 47.6 grams of a 5.5% concentration solution of tert-butyl hydroperoxide is dispensed to the flask over a period of 45 minutes. A copolymer dispersion of pressure-sensitive adhesive is produced with 70% solids by weight.

F. Acrylic dispersion 6

Using a flask equipped with a mechanical stirrer, a charge composed of 1.34 g tetrasodium pyrophosphate, 269 g of deionized water, and 0.68 g ascorbic acid is warmed to 86° C. Next, 28 g of 6.6% concentration sodium persulfate in water is poured into the flask. Over a span of four hours, an emulsion made up of 24.5 g of 10% strength aqueous sodium hydroxide solution, 30 g of a 33% concentration solution of a sulfuric ester sodium salt of lauryl alcohol ethoxylated by 30 moles of ethylene oxide in water, 10.6 g of 25.0% concentration sodium vinylsulfonate solution in water, 5 g of a 44% strength solution of DOWFAX™ 2A1 in water, 2.2 g of lauryl alcohol ethoxylated with 7 mol of ethylene oxide, 172 g of water, 27.6 g of styrene, 1,079.2 g of 2-ethylhexyl acrylate, 55.2 g of vinyl acetate, 162 g of methyl methacrylate, and 7.2 g of acrylic acid is gradually dispensed into the flask. At the outset, the rate of addition is 1.42 g/minute for the first six minutes. The rate of addition is then raised steadily to 7.1 g/minute over the span of forty minutes. From the outset of the emulsion feed, 148 g of a sodium peroxodisulfate solution at 5% strength in water is added at a constant rate over five hours, and the reaction medium is maintained from 85 to 87° C.

After the completion of the feeds and at roughly 70° C., a solution of 1.38 g sodium bisulphite, 0.9 g acetone and 22.2 g water, and, at the same time, 23.8 g of a 5.5% concentration solution of tert-butyl hydroperoxide is dispensed to the flask during the span of sixty minutes.

G. Acrylic Dispersion 7

Sodium carbonate (0.01% BOM, 0.55 g) was added as buffer to a 96° C. kettle charge of a water (518 g) swept with nitrogen, equipped with overhead stirring, thermometer, and reflux condenser. This was followed by ammonium persulfate (0.217% BOM, 5.9 g) as initiator and a preform seed charge (100 nm starting particle size, 1.251% BOM, 70.79 g) to set the initial particle size. A monomer emulsion feed and cofeed were started. The monomer emulsion consisted of sodium carbonate (0.02% BOM, 1.4 g), itaconic acid (0.2%, 5.1 g), acrylic acid (0.8% BOM, 20.4 g), disodium ethoxylated alcohol half ester of sulfosuccinic acid (0.17%, 14.3 g), sodium dodecylbenzenesulfonate (0.21% BOM, 24.2 g), butyl acrylate (71.1% BOM, 1818 g), methyl methacrylate (6.0% BOM, 152.8 g), styrene (1.6% BOM, 40.8 g) and water (16.8% of total monomer emulsion, 4 1 lg) and was fed for 75 minutes. The co-feed of ammonium persulfate (0.173% BOM, 4.6 g) was fed for 75 minutes. The temperature of the reaction was controlled between 88-90° C. Partway through the monomer emulsion feed an intercept of sodium dodecylbenzenesulfonate (0.235% BOM, 26.5 g) was added to the kettle. Once the addition of the monomer emulsion concluded, it was held at temperature. After fifteen minutes the kettle was cooled to 75° C. and dilute iron sulfate (0.001% BOM, 0.03 g) and tetrasodium ethylenediaminetetraacetate (0.001% BOM, 0.03 g) was added to the kettle. Subsequently a monomer emulsion feed and cofeeds were started. The monomer emulsion consisted of tetrasodium 1,1-diphosphonatoethanol (0.002%, 0.1 g), acetic acid (0.03% BOM, 0.6 g), sodium dodecylbenzenesulfonate (0.05% BOM, 5.3 g), butyl acrylate (5% BOM, 127.8 g), butyl methacrylate (15% BOM, 353.3 g), 3-methylmercaptopropionate (0.38% BOM, 9.8 g) and water (105.7 g) for 20 minutes. One cofeed consisted of t-butlyhydroperoxide (0.4% BOM, 15.1 g) and was fed for 50 minutes. The other cofeed consisted of sodium hydroxymethanesulfonate (0.24% BOM, 8.1 g) and was fed for 50 minutes. During the monomer emulsion feed the temperature was controlled at 74-76° C. Once the monomer emulsion finished, the batch was allowed to cool to 65° C. The dispersion was then neutralized with ammonium hydroxide until a pH of 7 was obtained. After neutralization the batch was cooled to below 35° C.

Table 2 below summarizes the properties for acrylic dispersions 1-7 where component amounts are shown as weight percent based on dry weight of the acrylic dispersion.

TABLE 2

Acrylic dispersions composition and properties

| Component | Acrylic Dispersion 1 | Acrylic Dispersion 2 | Acrylic Dispersion 3 | Acrylic Dispersion 4 | Acrylic Dispersion 5 | Acrylic Dispersion 6 | Acrylic Dispersion 7 |
|---|---|---|---|---|---|---|---|
| 2-EHA | 71.5 | | | 80 | 59.5 | 80.9 | — |
| MA | — | | | 8 | — | — | — |
| MMA | 9 | | | 8 | 12.0 | 12.1 | 6.0 |
| Styrene | — | | | 2 | 2.1 | 2.1 | 1.6 |
| 2-hydroxyethyl acrylate | — | | | 1 | — | — | — |
| AA | 1 | | | 1 | 0.55 | 0.55 | 0.8 |
| BA | — | | | 0 | — | — | 76.1 |
| EA | 18.5 | | | 0 | 25.4 | — | |
| Itaconic acid | — | | | — | 0.2 | — | 0.2 |
| Sodium vinyl sulfonate | — | | | — | 0.25 | 0.25 | — |
| VA | — | | | — | — | 4.1 | — |
| n-butyl methacrylate | — | | | — | — | — | 15 |
| Property | | | | | | | |
| pH | 7.5 | 7.75 | 4.75 | 6.1 | 4.5 | 4.2 | 7.0 |
| Solids (%) | 66.4 | 62 | 68 | 61 | 70 | 66 | 64 |
| Viscosity (cP) | — | 1000 | — | — | — | — | — |
| Tg | −41° C. | −45° C. | −53° C. | −40° C. | −33° C. | −46 | −26° C. |

Wt % based on dry weight of acrylic dispersion

2. Preparation of Ethylene Acid Dispersion

An aqueous ethylene acid dispersion was prepared utilizing a Bersdorf ZE25 48 LID 25 mm twin screw extruder (Kraus-Maffei Corporation, Florence KY, USA) rotating at 450 rpm according to the following procedure. The EAC resin was supplied to the feed throat of the extruder via a Schenck Mechatron loss-in-weight feeder and K-tron loss in weight feeders to control blend composition. The EAC resin was melt blended, and then emulsified in the presence of initial aqueous stream (IA) and neutralized with a neutralizing agent (potassium hydroxide (KOH), ammonia, or dimethylethanolamine) both injected using ISCO dual syringe pumps (from Teledyne Isco, Inc., Lincoln NE, USA). The dispersion phase was then conveyed forward to the dilution and cooling zone of the extruder where additional dilution water was added by ISCO dual syringe pumps to form the aqueous dispersion having solid level content less than 70 weight percent. The barrel temperature of the extruder was set to 140-150° C. After the ethylene acid dispersion exited the extruder, it was further cooled and filtered via a 200 μm mesh size bag filter.

Specific feed rates and results are shown in Table 3 below.

Performance testing was conducted after the adhesive laminate was conditioned in a controlled environment (22.2 to 23.3° C. (72 to 74° F.), 50% relative humidity) for at least 1 day (24 hours).

High density polyethylene (HDPE) panels purchased from Cheminstruments (510 Commercial Dr., West Chester Township, OH 45014) are cleaned and conditioned prior to being used for adhesive testing. Panels are wiped with lint-free, non-abrasive cloth soaked in isopropanol to remove any adhesive residue from prior testing. Care is taken not to scratch the surface. Once panel surface appears clean, an additional wipe is performed using isopropanol. The HDPE panel is conditioned for a minimum of 4 hours but no more than 24 hours at 22.2 to 23.3° C. (72 to 74° F.), 50% relative humidity.

TABLE 3

Preparation parameters for ethylene acid dispersions

| Sample | EMAA/EAA Feed 1, g/min | EMAA/EAA Feed 2, g/min | Dispersant, g/min | IA, mL/min | Neutralizing Base, mL/min | Dilution Water, mL/min |
|---|---|---|---|---|---|---|
| EMAA 1 | NUCREL ™ 960, 40.0 | — | — | 41.0 | Dimethylethanolamine, 7.0 | 217 |
| EMAA 2 | NUCREL ™ 699, 56.8 | NUCREL ™ 960, 18.9 | — | 37.5 | 30% potassium hydroxide, 6.3 | 200 |
| EMAA 3 | NUCREL ™ 699, 56.8 | NUCREL ™ 960, 18.9 | — | 38.0 | 30% potassium hydroxide, 4.6 | 125 |
| EMAA 4 | NUCREL ™ 903, 52.9 | — | PRIMACOR ™ 5980i, 22.7 | 32 | Dimethylethanolamine, 17.8 | 110 |
| EMAA 5 | NUCREL ™ 925, 75.7 | — | — | 33.1 | 30% potassium hydroxide, 5.8 | 275 |
| EMAA 6 | NUCREL ™ 925, 56.8 | NUCREL ™ 960, 18.9 | — | 33.9 | 30% potassium hydroxide, 4.9 | 275 |
| EAA 1 | PRIMACOR ™ 1410, 47.6 | — | PRIMACOR ™ 5980i, 20.4 | 33.4 | Dimethylethanolamine, 11.2 | 120 |
| EAA 2 | NUCREL ™ 2806, 50.0 | — | — | 19.2 | 28 wt % Ammonia, 3.4 | 105 |
| EAA 3 | PRIMACOR ™ 3440, 53.0 | — | PRIMACOR ™ 5980i, 22.7 | 30.5 | Dimethylethanolamine, 13.0 | 130 |

3. Preparation of Pressure Sensitive Adhesive Composition

Water-based pressure sensitive adhesive composition was formulated as follows. All samples were formulated with a wetting agent, 0.3% (wet/wet) SURFYNOL 440 wetting agent obtained from Evonik ("440"), based on total dispersion, to improve wet-out for lab drawdowns unless otherwise specified. The viscosity was then adjusted to approximately 600 mPa*s (600 cps) (Brookfield, RVDV, 30 rpm, 63#) using a thickener, ACRYSOL™ DR-5500, available from The Dow Chemical Company, Midland, Michigan ("DR-5500"), and final pH was adjusted to 7.0 to 7.5 using ammonium hydroxide.

The acrylic dispersion was blended with ethylene acid dispersion according to the dosage level shown in the respective table (wet or dry weight based on total weight of acrylic dispersion) under proper agitation.

4. Preparation of PSA Article

Lab Drawdowns:

Polypropylene ("PP") film (60 microns in thickness) was pre-treated by corona treatment before lamination. Samples of the water-based PSA composition were coated onto a release paper and dried at 80° C. for 5 minutes. The PP film was laminated with the water-based pressure-sensitive adhesive coated release liner ("adhesive laminate").

5. PSA Application Tests

Performance testing was conducted after the water-based PSA composition in the adhesive laminate was completely dried and conditioned in a controlled environment (22.2 to 23.3° C., 50% relative humidity) testing laboratory for at least overnight, and in some instances after as many as 120 hours under 12 kg of weight.

The composition of the dried PSA's are provided in Table 4. The peel adhesion, loop tack, and shear data for adhesive laminates with the dried PSA are provided in Tables 5 and 6.

6. Performance Testing of Formulations with EMAA1

EMAA1 was formulated with Acrylic Dispersion 2 and PSA application tests were performed according to the methods described above.

TABLE 4

Description of comparative samples and inventive examples

| | Parts of Acrylic Dispersion 1 by wet weight | Parts of Acrylic Dispersion 2 by weight | Additive (Parts by dry weight) | Additive (wt % based on dry weight) |
|---|---|---|---|---|
| CS1 | 100 | | Cohesa 3050 (0.4) | 0.6 |
| CS2 | | 100 | 0 | 0 |

TABLE 4-continued

| Description of comparative samples and inventive examples | | | | |
|---|---|---|---|---|
| | Parts of Acrylic Dispersion 1 by wet weight | Parts of Acrylic Dispersion 2 by weight | Additive (Parts by dry weight) | Additive (wt % based on dry weight) |
| IE1 | | 100 | EMAA1 (0.4) | 0.6 |
| IE2 | | 100 | EMAA1 (2) | 2.9 |

CS—comparative sample,
IE—inventive example

TABLE 5

| Peel, loop tack, and shear data of dried adhesive laminates | | | | | |
|---|---|---|---|---|---|
| | | CS1 | CS2 | IE1 | IE2 |
| 90° Peel (HDPE), 20 min | N/2.54 cm | 2.9 | 2.6 | 3.1 | 2.6 |
| 90° Peel (HDPE), 24 hr | N/2.54 cm | 3.6 | 3.4 | 4.1 | 3.9 |
| 90° Peel (SS), 20 min | N/2.54 cm | 7.7 | 7.5 | 7.9 | 7.4 |
| 90° Peel (SS), 24 hr | N/2.54 cm | 11.6 | 14.7 | 15.9 | 14.5 |
| 90° Peel (Glass), 20 min | N/2.54 cm | 5.8 | 5.8 | 5.8 | 5.4 |
| 90° Peel (Glass), 24 hr | N/2.54 cm | 7.1 | 7.5 | 7.5 | 7.6 |
| Loop Tack (HDPE) | N/6.45 $cm^2$ | 5.1 | 5.4 | 4.7 | 4.9 |
| Loop Tack (SS) | N/6.45 $cm^2$ | 8.7 | 8.3 | 7.5 | 6.9 |
| Loop Tack (Glass) | N/6.45 $cm^2$ | 9.6 | 9.0 | 8.9 | 8.5 |
| Shear (SS), 1" × 1", 1 kg | hrs | 75 | 200+ | 200+ | 175 |
| Shear (Glass), 1" × 1", 1 kg | hrs | 60 | 200+ | 200+ | 200+ |

The 90° HDPE peel adhesion (24 hr) observed for PSA articles (laminates) prepared from formulations of acrylic dispersion 1 with EMAA copolymer dispersions with low MI is unexpectedly higher than that of the sample with Cohesa 3050 (CS1) and the sample without any additive (CS2).

The formulation with low molecular weight and higher MI (Cohesa 3050 ethylene acrylic acid dispersion (CS1)) has lower adhesion to HDPE (lower 90° HDPE peel adhesion, 3.6 N/2.54 cm) than each inventive example IE1 (4.1 N/2.54 cm) and IE2 (3.9 N/2.54 cm). This is surprising because typically lower molecular weight additives such as high MI EAA copolymer dispersions are advantaged for increasing HDPE adhesion.

7. Performance Testing of Formulations with EMAA2 and EMAA3

In a separate experiment, EMAA2 and EMAA3 were formulated with Acrylic Dispersion 2 and PSA application tests were performed according to the methods described above.

TABLE 6

| Description of comparative samples and inventive examples | | | |
|---|---|---|---|
| | Parts of Acrylic Dispersion 2 by wet weight | Additive (Parts by dry weight) | Additive (wt % based on total dry weight) |
| CS2 | 100 | 0 | 0 |
| IE3 | 100 | EMAA2 (4) | 6.1 |
| IE4 | 100 | EMAA3 (0.4) | 0.6 |

CS—comparative sample,
IE—inventive example

TABLE 7

| Peel, loop tack, and shear data of dried adhesive laminates | | | | | |
|---|---|---|---|---|---|
| | Parts of Acrylic Disper-sion 2 by weight | Additive (Parts by Dry Weight) | 90° Peel (HDPE), 20 min, N/2.54 cm | 90° Peel (HDPE), 24 h, N/2.54 cm | Loop Tack (HDPE), N |
| CS2 | 100 | 0 | 4.7 | 5.1 | 5.0 |
| IE3 | 100 | EMAA2 (4) | 5.2 | 5.1 | 4.9 |
| IE4 | 100 | EMAA3 (0.4) | 4.3 | 4.7 | 5.5 |

Each inventive example has higher adhesion to HDPE than CS2 in some respects. IE3 has higher 90° HDPE peel adhesion at 20 minutes than CS2, 5.2 N/2.54 cm vs. 4.7 N/2.54 cm. IE4 has higher HDPE tack than CS2, 5.5 N vs. 5.0 N. This is surprising because high molecular weight and low MI EMAA copolymer dispersions are not expected to increase HDPE adhesion.

8. Performance Testing of Formulations with EMAA1 with Other Acrylic Dispersions The acrylic dispersion was blended with the EMAA dispersion according to the dosage level shown in the respective table (wet weight based on total weight of acrylic dispersion) under proper agitation to achieve mixing.

TABLE 8

| | Acrylic dispersion (parts by weight) | EMAA1 parts by weight |
|---|---|---|
| IE7 | Acrylic dispersion 3 (100) | 1 |
| IE8 | Acrylic dispersion 3 (100) | 1 |
| IE9 | Acrylic dispersion 4 (100) | 1 |
| IE10 | Acrylic dispersion 5 (100) | 1 |
| IE11 | Acrylic dispersion 6 (100) | 1 |
| IE12 | Acrylic dispersion 7 (100) | 1 |

9. Performance Testing of Formulations with EMAA 4, EMAA 5, EMAA 6, EAA 1, and EAA 2

In a separate experiment, EMAA 4, EMAA 5, EMAA 6, EAA 1, and EAA 2 were formulated with Acrylic Dispersion 2 and PSA application tests were performed according to the methods described above.

TABLE 9

| Description of comparative samples and inventive examples | | | |
|---|---|---|---|
| | Parts of Acrylic Dispersion 2 by wet weight | Additive (Parts by dry weight) | Additive (wt % based on total dry weight) |
| CS2 | 100 | 0 | 0 |
| IE13 | 100 | EAA 1 (0.4) | 0.6 |
| IE14 | 100 | EAA 1 (2) | 3 |
| IE15 | 100 | EMAA 4 (0.4) | 0.6 |
| IE16 | 100 | EMAA 4 (2) | 3 |
| IE17 | 100 | EMAA 5 (0.4) | 0.6 |
| IE18 | 100 | EMAA 6 (0.4) | 0.6 |
| IE19 | 100 | EAA 2 (0.4) | 0.6 |
| IE20 | 100 | EAA 2 (2) | 3 |

CS—comparative sample,
IE—inventive example

TABLE 10

| Peel, loop tack, and shear data of dried adhesive laminates | | | | |
|---|---|---|---|---|
| | Parts of Acrylic Dispersion 2 by weight | Additive (Parts by Dry Weight) | 90° Peel (HDPE), 20 min, N/2.54 cm | 90° Peel (HDPE), 24 h, N/2.54 cm |
| CS2 | 100 | 0 | 2.8 | 3.8 |
| IE13 | 100 | EAA 1 (0.4) | 2.9 | 4.7 |
| IE14 | 100 | EAA 1 (2) | 3.0 | 4.3 |
| IE16 | 100 | EMAA 4 (2) | 3.2 | 4.6 |
| IE17 | 100 | EMAA 5 (0.4) | 2.7 | 4.0 |
| IE18 | 100 | EMAA 6 (0.4) | 2.8 | 4.4 |
| IE19 | 100 | EAA 2 (0.4) | 3.7 | 4.2 |
| IE20 | 100 | EAA 2 (2) | 4.4 | 4.3 |

Each inventive example has higher adhesion to HDPE than CS2 at either 20 minutes dwell time or at 24 hours dwell time. IE13-16 and IE19-20 have higher 90° HDPE peel adhesion at 20 minutes than CS2. While 1E17 and 1E18 do not exceed the 90° HDPE peel adhesion at 20 minutes of CS2, with a longer dwell time they surpass the CS2 with higher 90° HDPE peel adhesion at 24 hours. This is surprising because high molecular weight and low MI EMAA or EAA copolymer dispersions are not expected to increase HDPE adhesion. Performance testing of formulations with EAA 3

In a separate experiment, EAA 3 was formulated with Acrylic Dispersion 2 and PSA application tests were performed according to the methods described above.

TABLE 11

| Description of comparative samples and inventive examples | | | |
|---|---|---|---|
| | Parts of Acrylic Dispersion 2 by wet weight | Additive (Parts by dry weight) | Additive (wt % based on total dry weight) |
| CS2 | 100 | 0 | 0 |
| IE21 | 100 | EAA 3 (0.4) | 0.6 |
| IE22 | 100 | EAA 3 (2) | 3 |

CS—comparative sample,
IE—inventive example

TABLE 12

| Peel, loop tack, and shear data of dried adhesive laminates | | | | |
|---|---|---|---|---|
| | Parts of Acrylic Dispersion 2 by weight | Additive (Parts by Dry Weight) | 90° Peel (HDPE), 20 min, N/2.54 cm | 90° Peel (HDPE), 24 h, N/2.54 cm |
| CS2 | 100 | 0 | 3.6 | 5.1 |
| IE21 | 100 | EAA 3 (0.4) | 3.9 | 5.9 |
| IE22 | 100 | EAA 3 (2) | 4.9 | 6.2 |

Inventive examples IE21 and IE22 have higher adhesion to HDPE than CS2 as measured by 90° HDPE peel adhesion at 20 minutes and at 24 hours at two different loading levels. This is surprising because high molecular weight and low MI EAA copolymer dispersions are not expected to increase HDPE adhesion.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A water-based pressure-sensitive adhesive composition comprising:

(A) an acrylic dispersion comprising particles of
  (i) an acrylic-based polymer with a glass transition temperature (Tg) less than −20° C., and
  (ii) a surfactant;

(B) an ethylene acid dispersion comprising
  (i) particles of an ethylene acid copolymer having from 3 wt % to less than 50 wt % acid comonomer and a melt index from 1 g/10 min to 100 g/10 min as measured in accordance with ASTM D 1238 (190° C./2.16 kg), and
  (ii) at least one of a dispersant or a neutralizing agent.

2. The water-based pressure-sensitive adhesive composition of claim 1 wherein the acrylic-based polymer includes one or more acrylic-based monomers selected from the group consisting of acrylic acid (AA), butyl acrylate (BA), ethylhexyl acrylate (2-EHA), ethyl acrylate (EA), methyl acrylate (MA), butyl methacrylate (BMA), octyl acrylate, isooctyl acrylate, decyl acrylate, isodecyl acrylate, lauryl acrylate, cyclohexyl acrylate, methyl methacrylate (MMA), isobutyl methacrylate, octyl methacrylate, isooctyl methacrylate, decyl methacrylate, isodecyl methacrylate, lauryl methacrylate, pentadecyl methacrylate, stearyl methacrylate, n-butyl methacrylate, $C_{12}$ to $C_{18}$ alkyl methacrylates, cyclohexyl methacrylate, methacrylic acid, and combinations thereof.

3. The water-based pressure-sensitive adhesive of claim 2 wherein the acrylic-based polymer includes a monomer selected from the group consisting of styrene, vinyl ester, and combinations thereof.

4. The water-based pressure-sensitive adhesive composition of claim 1 wherein the acrylic-based polymer has a Tg from −80° C. to −20° C.

5. The water-based pressure-sensitive adhesive composition of claim 1 wherein the ethylene acid copolymer is selected from the group consisting of ethylene and acrylic acid copolymer, ethylene and methacrylic acid copolymer, and combinations thereof.

6. The water-based pressure-sensitive adhesive composition of claim 5 wherein the ethylene acid copolymer is an ethylene and methacrylic acid copolymer.

7. The water-based pressure-sensitive adhesive composition of claim 5 wherein the ethylene acid copolymer is an ethylene and acrylic acid copolymer.

8. The water-based pressure-sensitive adhesive composition of claim 1 wherein the particles of the ethylene acid copolymer have a volume average particle size from 0.05 microns to 2.0 microns.

9. The water-based pressure-sensitive adhesive composition of claim 1 wherein the ethylene acid copolymer has
  a density from 0.920 g/cc to 0.960 g/cc;
  a melting point, Tm, from 70° C. to 110° C.; and
  a Vicat softening point from 48° C. to 95° C.

10. The water-based pressure-sensitive adhesive composition of claim 1 comprising
  (A) from 40 wt % to 99.8 wt % of the acrylic dispersion;
  (B) from 10 wt % to 0.2 wt % of the ethylene acid dispersion;
  (C) from 0 wt % to 50 wt % tackifier;
  wherein weight percent is based on the total dry weight of the water-based pressure-sensitive adhesive composition.

11. The water-based pressure-sensitive adhesive composition of claim 1 wherein the ethylene acid copolymer in the particles (B)(i) consists of one or more ethylene acid copolymers having a melt index from 1 g/10 min to 95 g/10 min as measured in accordance with ASTM D 1238 (190° C./2.16 kg).

12. A water-based pressure-sensitive adhesive composition comprising:

(A) an acrylic dispersion comprising particles of (i) an acrylic-based polymer with a glass transition temperature (Tg) less than −20° C., and (ii) a surfactant;

(B) an ethylene acid dispersion comprising (i) composite particles composed of a first ethylene acid copolymer having from 3 wt % to 50 wt % acid comonomer, and a second ethylene acid copolymer having from 3 wt % to 50 wt % acid comonomer, the second ethylene acid copolymer different than the first ethylene acid copolymer, the first ethylene acid copolymer and the second ethylene acid copolymer each having a melt index from 1 g/10 min to 100 g/10 min as measured in accordance with ASTM D 1238 (190° C./2.16 kg); and (ii) at least one of a dispersant or a neutralizing agent.

13. An article comprising:

a first substrate; and a layer of a water-based pressure-sensitive adhesive composition on the first substrate, the water-based pressure-sensitive adhesive composition comprising:

(A) an acrylic dispersion comprising particles of (i) an acrylic-based polymer with a glass transition temperature (Tg) less than −20° C., and (ii) a surfactant;

(B) an ethylene acid dispersion comprising (i) particles of an ethylene acid copolymer having from 3 wt % to less than 50 wt % acid comonomer and a melt index from 1 g/10 min to 100 g/10 min as measured in accordance with ASTM D 1238 (190° C./2.16 kg), and (ii) at least one of a dispersant or a neutralizing agent.

14. The article of claim 13 wherein the ethylene acid copolymer in the particles (B)(i) consists of one or more ethylene acid copolymers having a melt index from 1 g/10 min to 95 g/10 min as measured in accordance with ASTM D 1238 (190° C./2.16 kg).

* * * * *